G. ERLINGER.
FIRING APPARATUS.
APPLICATION FILED NOV. 15, 1916.

1,308,233.

Patented July 1, 1919.
5 SHEETS—SHEET 1.

Witnesses:
Robert H. Weir
Arthur W. Carlson

Inventor
George Erlinger
By Offield Towle Graves & Offield Attys

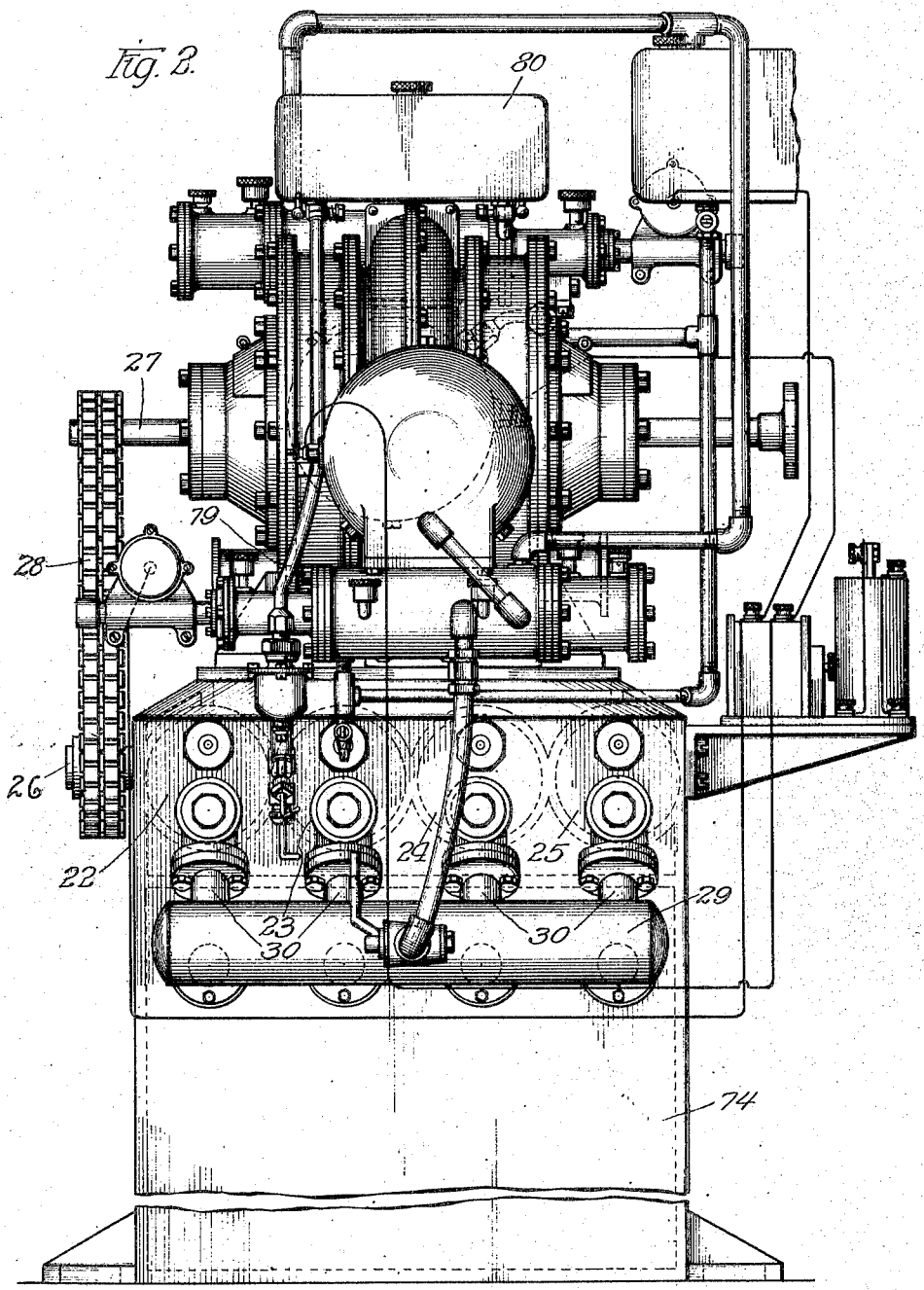

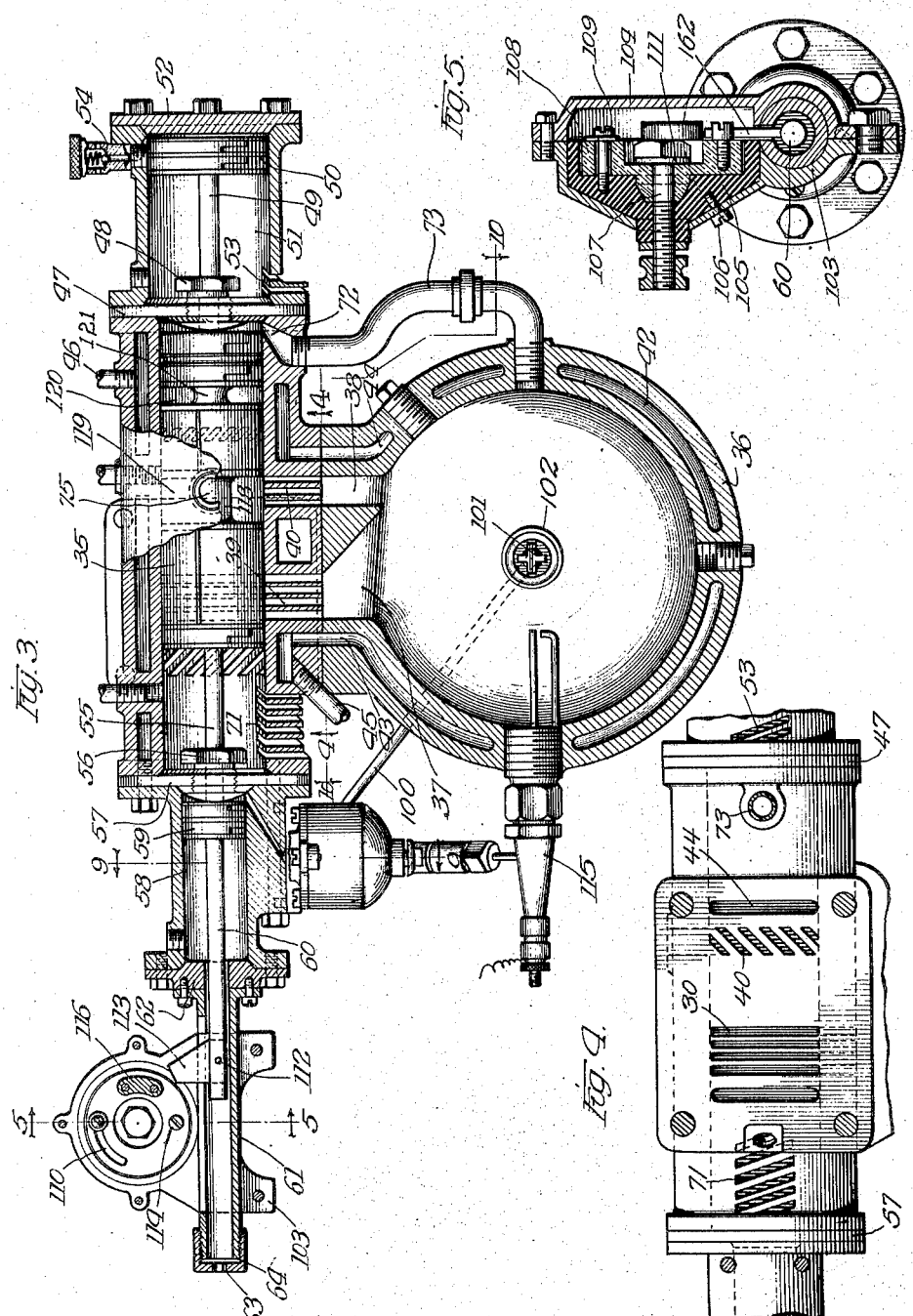

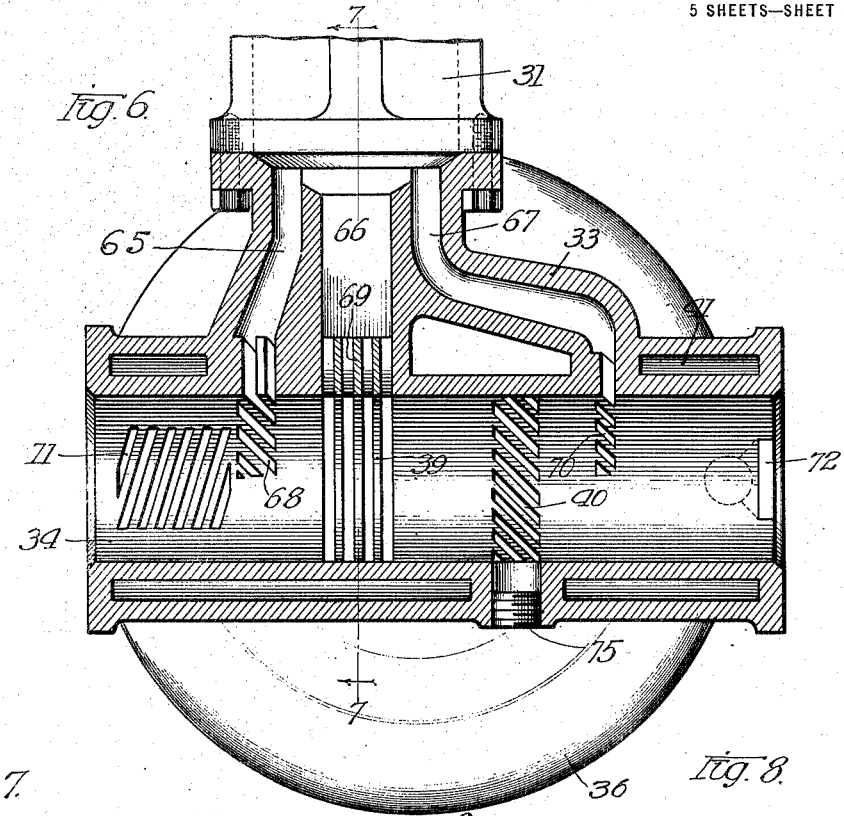

G. ERLINGER.
FIRING APPARATUS.
APPLICATION FILED NOV. 15, 1916.
1,308,233.
Patented July 1, 1919.
5 SHEETS—SHEET 5.
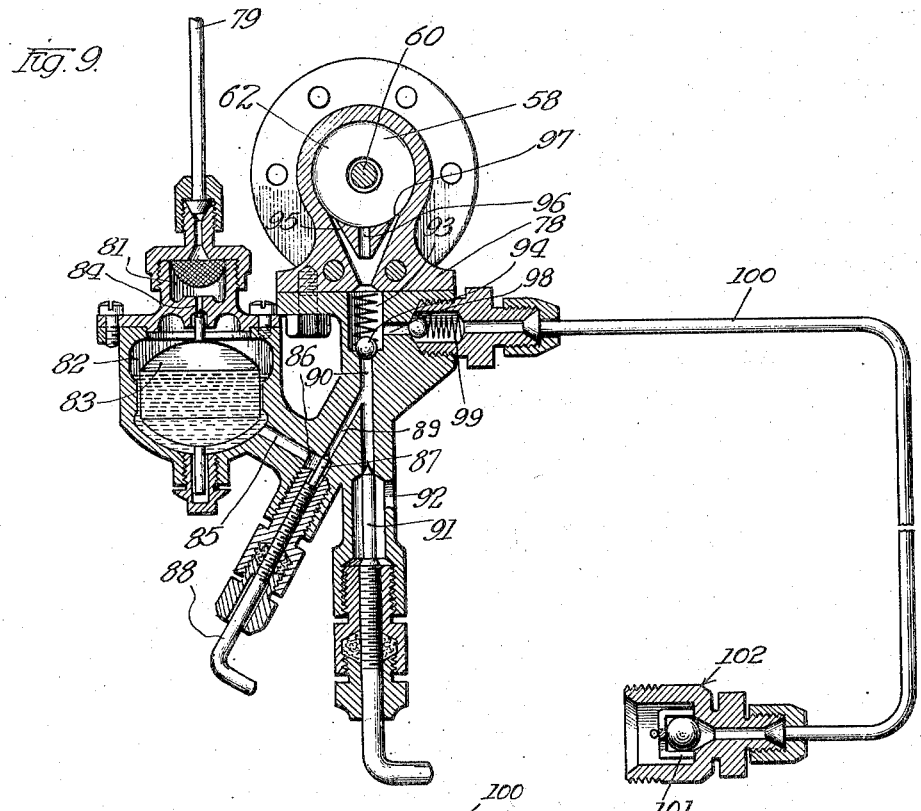
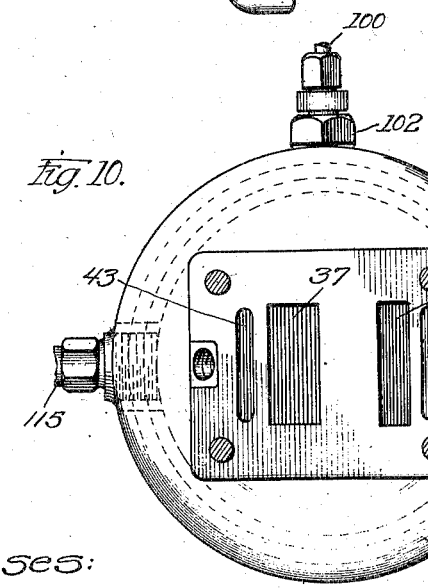
Witnesses:
Robert H. Weir
Arthur W. Carlson
Inventor
George Erlinger
By Offield Towle Graves & Offield Attys

UNITED STATES PATENT OFFICE.

GEORGE ERLINGER, OF MILWAUKEE, WISCONSIN, ASSIGNOR OF ONE-HALF TO ALBERT O. TROSTEL, OF MILWAUKEE, WISCONSIN.

FIRING APPARATUS.

1,308,233.   Specification of Letters Patent.   Patented July 1, 1919.

Application filed November 15, 1916. Serial No. 131,605.

*To all whom it may concern:*

Be it known that I, GEORGE ERLINGER, a citizen of the United States, residing at Milwaukee, in the county of Milwaukee and State of Wisconsin, have invented certain new and useful Improvements in Firing Apparatus, of which the following is a specification.

My invention relates to improvements in firing apparatus, and, although capable of many applications, is particularly well adapted for use in connection with prime motors operated by gas under pressure. As a particular application of my invention, I shall describe my improved apparatus as employed for firing successive charges of fluid fuel and subsequently introducing the high pressure exploded gases into a rotary turbine.

The principal object of the invention is to provide an apparatus so organized as to permit the burning or igniting of successive charges of fuel in a confined explosion space or chamber, and subsequently delivering the resulting high pressure gas to a power-utilizing device. Further objects of the invention, and particularly in connection with the specific embodiment herein described, will hereinafter appear.

In the drawings which illustrate my invention as applied to firing apparatus for a turbine—

Fig. 2 is a side elevation of the apparatus shown in Fig. 1;

Fig. 3 is a section taken on the line 3—3 of Fig. 1;

Fig. 4 is a view taken on the line 4—4 of Fig. 3;

Fig. 5 is a section taken on the line 5—5 of Fig. 3;

Fig. 6 is a section taken on the line 6—6 of Fig. 1;

Fig. 7 is a section taken on the line 7—7 of Fig. 6;

Fig. 8 is a section taken on the line 8—8 of Fig. 7;

Fig. 9 is a section through the carbureter taken on the line 9—9 of Fig. 3; and

Fig. 10 is a view taken on the line 10—10 of Fig. 3.

Figure 1:
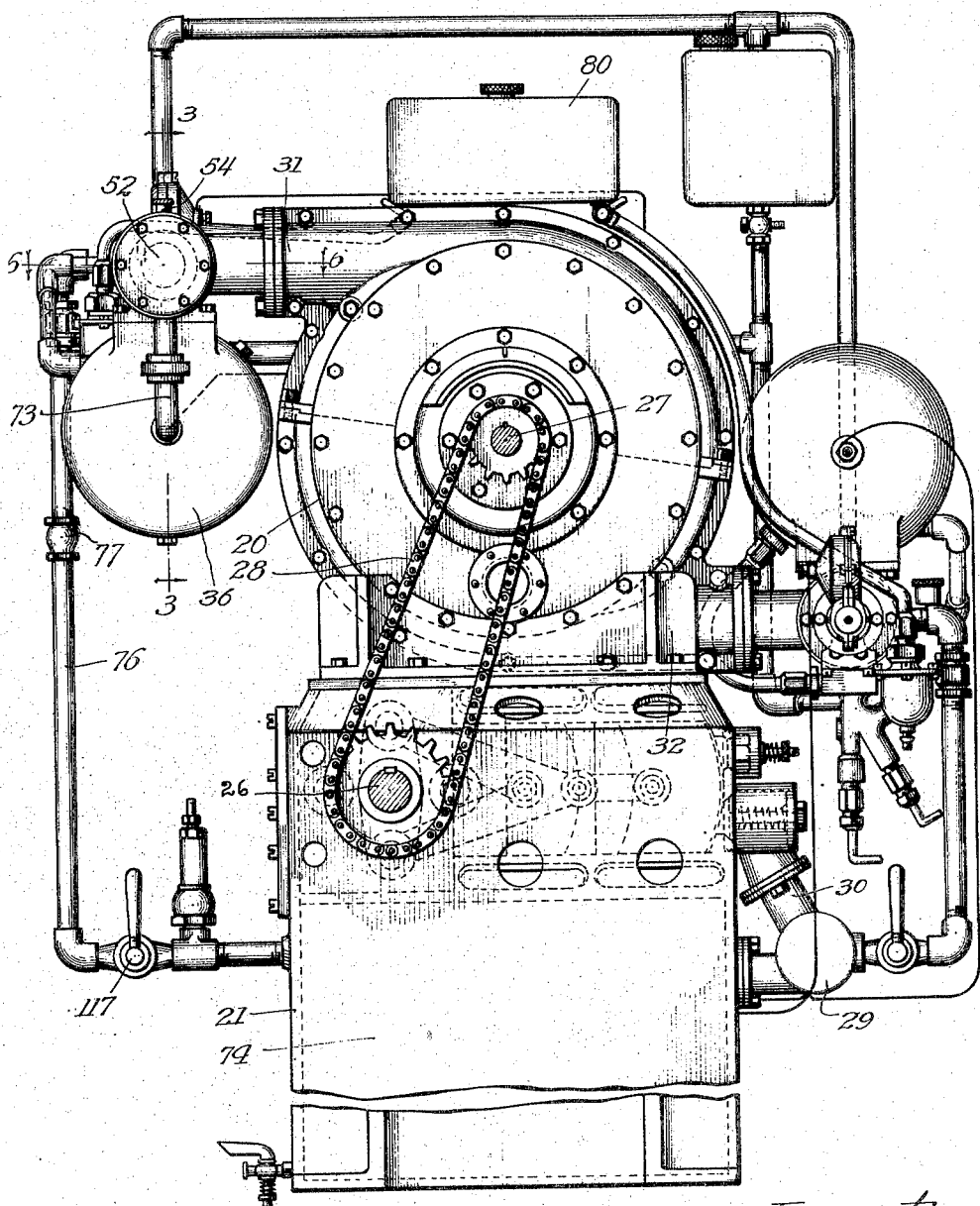
Figure 1 is an end elevation of the turbine and the firing apparatus associated therewith.

Referring to the drawings, 20 represents the housing of the turbine, which is mounted upon a substantially rectangular hollow cast iron frame casting 21. The interior details of construction of the turbine will not be specifically described, since the turbine herein shown is similar to that disclosed in my co-pending application Serial No. 131,606, filed November 15, 1916. The lower portion of said base casting 21 is made hollow and constitutes a tank for the storage of air under pressure, which is supplied by means of a set of air pumps indicated at 22, 23, 24, and 25 in Fig. 2, said pumps being driven from a shaft 26 actuated from the main shaft 27 of the turbine by means of a chain 28. It will of course be understood that the chain gearing herein shown is merely illustrative, the gear ratio being subject to change if conditions should warrant. The air delivered by said series of pumps is conducted to the air tank through a manifold 29 connected to the pumps by pipes, as at 30. The pumps are of any customary construction designed to effect economical delivery of a sufficient quantity of air under pressure to operate the apparatus herein described.

The firing mechanism and the apparatus associated therewith is in duplicate, both sets of apparatus supplying the turbine with motive fluid when the maximum amount of power is required to be generated. However, each firing apparatus may be operated independently of the other. The turbine is equipped with a pair of inlet chambers 31 and 32 to each of which is connected one of the motive fluid supplying mechanisms. As shown in Fig. 1, said turbine supply chambers are tangentially arranged with respect to the turbine, one of them being arranged at the bottom and the other at the top of the turbine. Since both sets of apparatus are substantially identical in effect and in construction, I shall confine my description principally to the upper set of firing mechanism.

To the flange of the turbine inlet chamber 31 I secure, by means of suitable bolts, the flange of a valve chamber casting 33. As shown in Fig. 6, said valve chamber 33 comprises a neck or throat portion and a transverse horizontally disposed cylindrical part bored out in the form of a cylinder 34 in order to accommodate a reciprocatory piston valve member 35. On the lower side of said valve chamber 33 I bolt a spherical gas explosion chamber 36 which communicates with the cylinder space 34 by means of a pair of ports 37 and 38 registering with sets of grid-iron ports 39 and 40 in the wall of the cylinder. Said valve chamber 33 is provided with a suitable water jacket, as shown at 41, which communicates with a water jacket 42 around the spherical gas explosion chamber by means of ports 43 and 44 which register with corresponding ports in the wall of the cylinder. Cold water is supplied to said water jacket by means of an inlet pipe 45, the hot water outlet being indicated at 46.

The right hand end of the cylinder (see Fig. 3) is closed by means of a cylinder head 47 equipped with a suitable gland 48 through which projects a piston rod 49 which connects the main piston 35 with a subsidiary piston 50 reciprocating in an air or vacuum cylinder 51 bolted onto the end of the main cylinder 34. The outer end of said cylinder is closed by means of a head 52, a vacuum thus resulting in the outer end of the cylinder 51 when the pistons are moved to the left of the figure. A set of ports 53 in the inner end of the wall of the cylinder 51 permits free escape or entrance of atmospheric air to the inner end of the cylinder 51 when the piston 50 reciprocates in said cylinder, and loss of vacuum in the outer end of said cylinder 51, due to possible leakage, is prevented by a check valve 54 directly communicating with the atmosphere.

To the left hand end of the main piston 35 is secured a piston rod 55 which operates through a gland 56 in the cylinder head 57, extends into a gas cylinder 58 and is connected to a piston 59 reciprocable in said cylinder 58. The igniting mechanism is actuated by means of a rod 60 secured in the outer end of the piston 59 and extending into a tube 61 bolted to the cylinder head 62. The pressure of air in the outer end of said cylinder 58 is relieved by means of small ports 63 drilled in the cap 64 covering the end of said tube 61, the tube itself being considerably larger in internal diameter than the diameter of the rod 60, thereby permitting the air to pass freely through said tube around the rod.

The throat of the valve casting 33 is cored out to form a series of three ducts or conduits 65, 66, and 67 which communicate with the interior of the cylinder 34 through sets of grid-iron ports 68, 69, and 70. The left hand end of the cylinder 34 communicates directly with the atmosphere through a set of grid-iron ports 71, and the port 72 at the other end of the cylinder furnishes communication with the spherical explosion chamber 36 by means of a by-pass pipe 73. Air under pressure from the air tank 74 is supplied to the interior of the cylinder 34 through a port 75 by means of a supply pipe 76 in which is inserted a check valve 77 for preventing back flow of air or exploded gas into the tank.

The carbureter, as shown in Figs. 3 and 9, is bolted to a flange 78 on the lower side of the gas cylinder 58. The pipe 79 conducts a supply of gasolene or other appropriate fluid fuel from a tank 80, the lower end of the pipe leading to a strainer chamber 81 formed above the float chamber 82 of the carbureter. A constant level of the fluid in said float chamber is obtained by means of a float 83 which closes a valve port 84 when the liquid in the float chamber rises to the required level. The lower portion of the float chamber 82 communicates, by means of a conduit 85, with a needle valve chamber 86 within which is a needle valve 87 adjustable by means of the handle 88. The gasolene spray issuing from the point of said needle valve 87 is conducted upwardly through a conduit 89 into a vertical mixing duct 90, where it meets an upwardly flowing stream of air controlled by a second needle valve 91 and entering the chamber of said last named valve through a port 92 directly communicating with the atmosphere.

The upper end of the vertical mixing conduit 90 is arranged to form a chamber 93, the lower end of which is adapted to be closed by a spring-actuated check valve ball 94. The upper end of said chamber 93 communicates with the cylinder 58 through a set of ports 95, 96, and 97. In the side of the chamber 93 is a transverse conduit 98 which is connected to a chamber 99 having a spring-actuated check valve contained therein to prevent back firing into the carbureter. Said check valve chamber 99 is connected, by means of a gas supply pipe 100, with a second or main check valve chamber 101 and a plug 102 screwed directly into and communicating with the interior of the spherical explosion chamber 36.

Describing the ignition mechanism, it will be seen that on the end of the tube 61 there is clamped a split housing composed of a main portion 103 and a cap portion 104. In the upper part of the portion 103 of said housing there is formed a cylindrical recess containing a block of insulation 105 secured therein by means such as a screw 106. The center of said block of insulation 105 is drilled out to accommodate an electrical conducting screw 107 which also assists in holding in position in said block of insulation a recessed metal disk 108. Said disk 108 is rotatable in the insulating block 105 and is connected to the ignition circuit by means of a suitable cable connected to the end of the terminal screw 107. The rotary movement of said disk 108 is limited by means of a stop screw 109 which passes through an arcuate slot 110 and is screwed into the block 105. In order to prevent too great a looseness in the rotary movement of said disk 108, I prefer to insert a tension washer of ordinary construction under the head of the screw 109, a similar tension washer 111 being inserted under the head of the terminal screw 107.

The outer end of the reciprocatory rod 60 on the piston 59 is slotted, and in said slot there is secured, by means of a pin 112, an angular projection contact plate or wiper 113, the upper end of which is in suitable position to engage a contact pin or screw 114 when the rod 60 is moved outwardly in the tube 61. The contact between the insulated pin 114 and the grounded plate 113 energizes a suitable spark coil or other analogous apparatus, the high tension terminal of which is connected to the terminal of a spark plug 115 inserted in the wall of the spherical explosion chamber 36. When the contact plate 113 strikes the pin 114, the rotary disk 108 will revolve on its axis and the bevel end 113 of the contact plate will wipe under and past the contact pin 114. The inertia of said disk 108 will carry it into a position slightly beyond the point of the wiper 113, its movement being arrested by the stop pin 109. The rotary disk 108 is returned to its normal position by virtue of the rear end or face of the wiper 113 engaging an insulated block 116 secured to the face of the contact disk 108, which is thus rotated into its original position when the wiper 113 retreats inwardly.

Describing the operation of the apparatus, when it is desired to commence firing, the cock 117 is turned into open position, thereby admitting air under pressure to the pipe 76. Assuming that the parts are in the position shown in Fig. 3, the combustion chamber is charged with a supply of gaseous fuel admitted during the previous stroke of the piston 35 to the right. The air in the tank 74 being under considerable pressure, will open the check valve 77 and pass through the upper port 75 into the space surrounding the central stem 118 of the main piston valve and will flow through the ports 40 and 38 into the combustion chamber 36. As soon as the pressure in said chamber increases sufficiently, the piston valve will be moved to the left of the figure by reason of the air or gas passing into the right hand end of the chamber through the pipe 73 and port 72. The air supply ports 40 will thereupon be closed by the solid right hand end of the piston and the inertia of the latter will carry it to the left far enough for the contact wiper 113 to strike the contact pin 114, whereupon the spark plug 115 will be energized by the connections previously described and the mixture inside the combustion chamber will be detonated. When said mixture explodes, the high pressure produced in the spherical combustion chamber will be communicated to the right hand end of the cylinder 34 by reason of the pipe 73, and the main piston will receive a powerful impetus in the same direction (to the left) in which it had been previously moving. This will result in the annular space 119 around the stem 118 being brought into register with the grid-iron ports 39 directly communicating with the explosion chamber by means of the port 37. When this occurs, the high pressure exploded gases will pass through said ports 37 and 39 into said annular space 119, and through the grid-iron ports 69 and conduit 66 into the inlet chamber 31 of the turbine, causing the latter to revolve at high speed.

When the control piston has reached its limit of movement toward the left hand end of the cylinder 34, the narrow annular space 120 surrounding the stem 121 of the main piston will register with the air admission port 75 and the grid-iron port 40. This will result in a scavenging charge of air under pressure being sent into the chamber, the products of combustion being expelled through the ports 39. At the same time, the right hand end of the piston uncovers the port 70 and the burnt gases in the right hand end of the cylinder 34 are expelled through said port 70 and conduit 67 into the turbine inlet chamber 31.

During the time that the piston elements have been moving in the left in the cylinder 34, the piston 50 has made a corresponding movement to the left in its cylinder 51 and has produced a strong vacuum in the right hand end of said cylinder 51. While the scavenging air is being admitted to the combustion chamber 36, the pressure therein is of course considerably lower than the pressure of the air in the tank, owing to the fact that the chamber is exhausting through the ports 39, and the right hand end of the cylinder 34 is exhausting through the port 70. The vacuum in the cylinder 51 will therefore cause the piston elements to retreat toward the right. During the movement of the piston to the right, the ports 40 and 70 are closed by the piston, and subsequently the ports 69 and 39. During the interval between the closing of the ports 40 and the closing of the ports 39 by the movement of the valve to the right, the turbine is in communication with the combustion chamber only, through a portion of the ports 39, the combustion chamber being otherwise sealed.

Hence, the pressure of scavenging air in the combustion chamber will be relieved, and, in fact, the rotation of the turbine for a brief period will tend to create a vacuum in the combustion chamber, thereby insuring a very complete elimination of the products of combustion.

The further movement of the piston toward the right opens up the port 68, thereby enabling the turbine to draw in a supply of fresh air through the conduit 65 and ports 68 and 71. This feature of my invention possesses several important advantages. In the first place, the free air thus admitted to the turbine between successive explosions serves to cool such heated surfaces as have been exposed to the hot gases; secondly, the heat thus derived from such heated surfaces causes an expansion and an increase in pressure of the air thus drawn in and results in a considerable increase in the power of the turbine; and, thirdly, the injurious vacuum effect which would otherwise be caused by suspending the supply of pressure gas to the turbine, is substantially eliminated.

Describing the arrangement for supplying the spherical combustion chamber 36 with its charge of combustible fuel,—when the piston system moves to the left of the apparatus, as has previously been described, the piston 59 in the gas supply cylinder 58 draws in a charge of fuel through the ports 95, 96, and 97 in the end of said cylinder, said ports communicating with the fuel supply, as has previously been described.

It should be understood that the amount of richness of the mixture may be conveniently regulated by adjusting the needle valve 91, as well as by the needle valve 87. As soon as the piston 59 reaches its limit of movement toward the left in the cylinder 58, the check valve 94 closes, and when the piston system is returned by reason of the vacuum piston 50, the mixture is forced out of said cylinder 58 through the ports 95, 96, and 97 into the chamber 93, through the port 98, check valve chamber 99, pipe 100, and check valve 101 into the combustion chamber 36. The incomplete mixture of gaseous fuel and air thus admitted to the combustion chamber 36 becomes mixed with an additional supply of air admitted into the combustion chamber through the ports 75 and 40. The cycle of operations is repeated indefinitely.

I have shown the firing apparatus connected directly to the intake of the turbine, but it will be readily understood that conditions may arise which would make it desirable to operate the turbine at a considerable distance from the firing apparatus, such an arrangement being eminently feasible and practicable in connection with my improvements. It will be readily understood that the firing apparatus is asynchronous and may be operated entirely independently of the turbine by utilizing an independent power source for operating the pump. One or more sets of firing apparatus may be applied to the same turbine and operated in conjunction with each other, or independently.

It will be manifest that the embodiment herein described shows only one application of my invention, which may be embodied in other forms without sacrifice of efficiency. The scope of the invention must therefore be determined by reference to the appended claims.

I claim—

1. The combination of a turbine, means for intermittently supplying high pressure fluid to said turbine, and automatic means for admitting to said turbine during the intervals in which the supply of high pressure fluid is suspended, fluid at not more than atmospheric pressure.

2. The combination of a turbine, means for supplying to said turbine successive gusts of high pressure gaseous fluid, and automatic means for supplying air at atmospheric pressure to the turbine intermediate said gusts.

3. The combination of a turbine, means for igniting successive charges of fuel and thereby producing charges of high pressure gas, and valve mechanism for admitting said exploded gases to said turbine and adapted to supply said turbine with air at atmospheric pressure intermediate the successive gusts of high pressure gas.

4. The combination of a turbine, an explosion chamber, means for introducing fuel into said explosion chamber and igniting same, valve mechanism for placing said explosion chamber into communication with said turbine subsequent to the ignition of said fuel, and adapted to admit a supply of air at atmospheric pressure to said turbine intermediate successive supplies of exploded gases.

5. The combination of a turbine provided with a port for direct admission of inert low pressure fluid, an explosion chamber provided with a port leading into said turbine, means for introducing fuel into said explosion chamber and igniting said fuel, and valve mechanism controlling the communication between said explosion chamber and said turbine and adapted to open and close said first port and arranged to admit a supply of said inert fluid to said turbine intermediate successive supplies of exploded gases.

6. The combination of a combustion chamber provided with an inlet for the admission of fuel, an outlet port and a valve associated with said outlet port, the position of said valve being determined by fluid pressure, and a by-pass into said combustion chamber for conducting fluid from said chamber to said valve to operate the same.

7. The combination of a combustion chamber provided with an inlet for the admission of fuel and an outlet port, a valve associated with said outlet port, the position of said valve being determined by fluid pressure, and a by-pass into said combustion chamber for conducting fluid from said chamber to said valve to operate the same.

8. The combination of a combustion chamber provided with an inlet port for introducing fuel into said chamber and an outlet port for delivering the products of combustion, valve means associated with said outlet port, a valve-actuating cylinder, and a by-pass connecting said combustion chamber with said cylinder for conducting fluid from said chamber to said cylinder to actuate said valve.

9. The combination of a combustion chamber provided with an inlet port for introducing fuel into said chamber and an outlet port for delivering the products of combustion, valve means associated with said outlet port, a valve-actuating cylinder, and a by-pass connecting said combustion chamber with said cylinder for conducting fluid from said chamber to said cylinder to actuate said valve to open said outlet port.

10. The combination of a combustion chamber provided with an inlet port for introducing fuel into said chamber and an outlet port for delivering the products of combustion, valve means associated with said outlet port, a valve-actuating cylinder, a by-pass connecting said combustion chamber with said cylinder for conducting fluid from said chamber to said cylinder to actuate said valve to open said outlet port, and automatic means for returning said valve to normal position subsequent to the delivery of the products of combustion.

11. The combination of a combustion chamber provided with an inlet port for introducing fuel into said chamber and an outlet port for delivering the products of combustion, valve means associated with said outlet port, a valve-actuating cylinder, a by-pass connecting said combustion chamber with said cylinder for conducting fluid from said chamber to said cylinder to actuate said valve to open said outlet port, automatic means for returning said valve to normal position subsequent to the delivery of the products of combustion, and means for igniting fuel admitted to said chamber controlled by the position of said valve.

12. The combination of a combustion chamber, means for admitting fuel into said chamber, ignition mechanism, and valve mechanism for controlling the delivery of exploded fuel from said chamber controlled by pressure of fluid in said chamber and adapted to admit a scavenging charge of air to said chamber subsequent to the delivery of the products of combustion.

13. The combination of a combustion chamber, means for introducing a supply of fuel into said combustion chamber, a valve for controlling the egress of exploded fuel from said chamber, a piston for actuating said valve, and a cylinder for said piston connected with said combustion chamber whereby the pressure of fluid in said combustion chamber serves to actuate said piston to open said valve, said cylinder being provided with an exhaust port for relieving the pressure in said cylinder.

14. The combination of a combustion chamber, means for admitting fuel into said chamber, means for introducing a supply of air under pressure into said chamber, a valve for controlling the delivery of exploded fuel from said chamber, a piston controlling said valve, a cylinder for said piston connected directly with said chamber, the movement of the piston in valve-opening direction being initiated by the pressure of air admitted into said combustion chamber, and means for igniting the mixture of air and fuel in said combustion chamber actuated by the initial movement of said piston.

15. The combination of a combustion chamber, means for admitting fuel into said chamber, means for introducing a supply of air under pressure into said chamber, a valve for controlling the delivery of exploded fuel from said chamber, a piston controlling said valve, a cylinder for said piston connected directly with said chamber, the movement of the piston in valve-opening direction being initiated by the pressure of air admitted into said combustion chamber, means for igniting the mixture of air and fuel in said combustion chamber actuated by the initial movement of said piston, and automatic means for returning said piston.

16. The combination of a combustion chamber, means for admitting fuel into said chamber, means for introducing a supply of air under pressure into said chamber, a valve for controlling the delivery of exploded fuel from said chamber, a piston controlling said valve, a cylinder for said piston connected directly with said chamber, the movement of the piston in valve-opening direction being initiated by the pressure of air admitted into said combustion chamber, means for igniting the mixture of air and fuel in said combustion chamber actuated by the initial movement of said piston, and automatic means for returning said piston, said fuel-admitting means being controlled by the movement of said piston.

17. The improvement in the art of deriving power from the explosion of gases, which consists in exploding a charge of fluid in a chamber, conducting the resulting high pressure gases into a rotary turbine and thereby causing the said turbine to revolve and produce a partial vacuum within said turbine, and subsequently admitting into said turbine a supply of low pressure fluid sucked into said turbine by the partial vacuum so produced.

GEORGE ERLINGER.